Aug. 10, 1971     MASATARO FUKUDA ET AL     3,598,653
SEALED-TYPE LEAD STORAGE BATTERY WITH GAS RECOMBINING MEANS
Filed Nov. 3, 1969
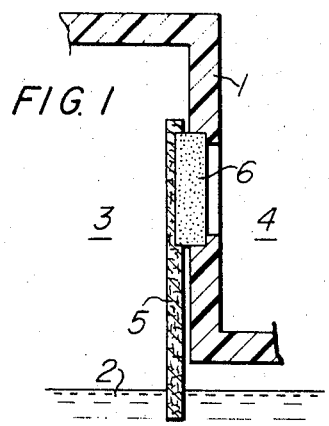
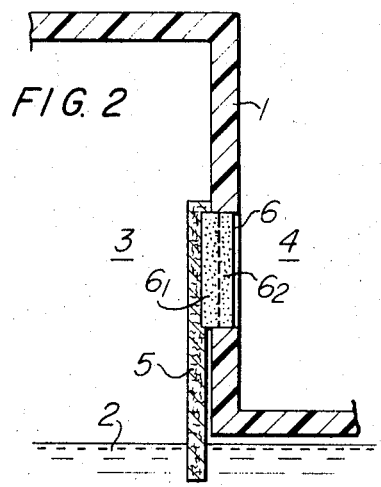
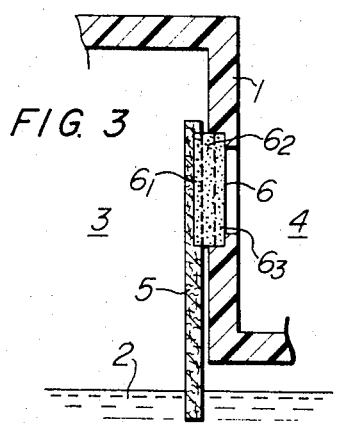
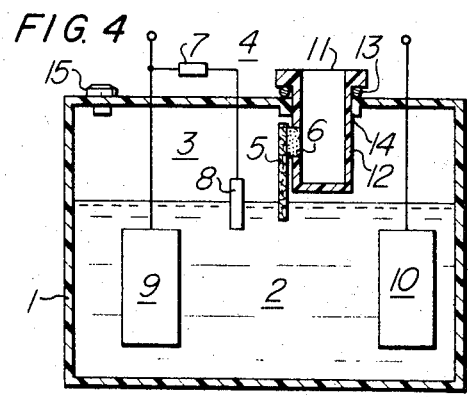
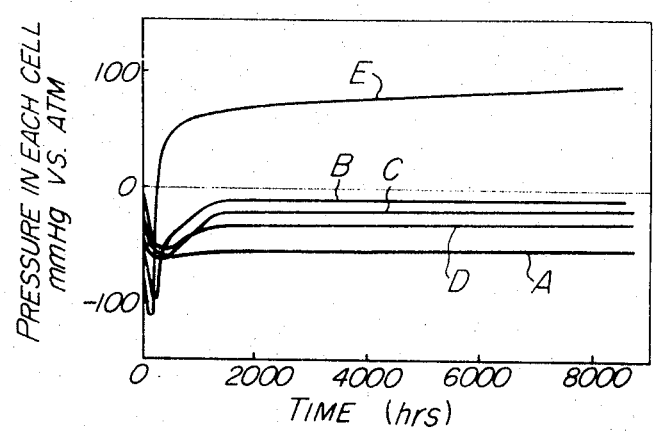
M. FUKUDA,
T. MIURA
and
K. TAKAHASHI
INVENTORS
BY Stevens, Davies, Miller &
Mosher
ATTORNEY United States Patent Office 3,598,653
Patented Aug. 10, 1971

3,598,653
SEALED-TYPE LEAD STORAGE BATTERY WITH GAS RECOMBINING MEANS
Masataro Fukuda, Toyonaka-shi, Takashi Miura, Fujisawa-shi, and Katsuhiro Takahashi, Hirakata-shi, Japan, assignors to Matsushita Electric Industrial Co., Ltd., Osaka, Japan
Filed Nov. 3, 1969, Ser. No. 873,403
Claims priority, application Japan, Nov. 6, 1968, 43/81,739; Sept. 19, 1969, 44/76,063, 44/76,087
Int. Cl. H01m 1/08
U.S. Cl. 136—26
6 Claims

ABSTRACT OF THE DISCLOSURE

In a sealed-type lead storage battery, a reactive element having waterproofing capacity and catalytic activity is interposed between the interior and exterior gaseous phases of the battery and an electrolyte-impregnated body is closely attached to the inside face of the reactive element with a portion thereof immersed in the electrolyte, whereby a pressure rise within the battery due to the accumulation of excess hydrogen and a lowering of the positive electrode capacity due to self-discharge of the positive electrode can effectively be prevented which could not be solved by the conventional sealing methods.

---

The present invention relates to improvements in the lead storage batteries.

Lead storage batteries have commonly been used in a wide range of application on account of their low costs and high reliability. However, in this type of battery oxygen gas is generated at the positive electrode and combustible hydrogen gas from the negative electrode at the last stage of charging or when the battery has been overcharged, as a result of the electrolysis of water and in this case a highly corrosive mist of sulfuric acid is formed. Thus, there is the danger of equipment around the battery being corroded or catching fire. In addition, the battery requires maintenance operations, including frequent supplementation of the electrolyte as the water in the electrolyte decreases due to electrolysis or natural evaporation. The most effective method of eliminating such inconveniences is to seal the battery and various sealing methods have been proposed.

Further, in the overcharged state of the lead storage battery, oxygen gas is generated at the positive electrode and hydrogen gas at the negative electrode, as stated above, and in this case it is known that while the hydrogen gas is generated in electrochemical equivalent relative to the charging current, the amount of the oxygen gas generated tends to be considerably less than the amount corresponding to the charging current. Namely, less than one part by volume of oxygen gas is generally generated per two parts by volume of hydrogen gas. This is probably because the oxidation of $PbSO_4$ and $PbO$, present in the positive electrode active material, and Pb of the positive electrode lattice continues even after the battery has been overcharged and the reduction reactions other than the generation of hydrogen have been substantially stopped at the negative electrode, and the oxygen gas generated becomes short just by the amount corresponding to the current used for such oxidation.

Therefore, of the conventionally proposed sealed-type storage batteries, the one which incorporates only a catalyst for a gas phase reaction to revert the oxygen gas and the hydrogen gas into water, represented by the chemical formula $2H_2+O_2 \rightarrow 2H_2O$, has the drawback that excess hydrogen which does not participate in said gas phase reaction is accumulated within the battery and finally the battery container is broken by the pressure built up therein.

In order to overcome such a drawback, there has been proposed a method in which a gas eliminating auxiliary electrode is used and a potential control element, such as a diode or a non-linear resistor consisting of a sintered body of mainly ZnO, is interposed between said auxiliary electrode and the positive electrode to maintain the auxiliary electrode at a potential effective for the elimination of the gas, or a method in which the above-described method is combined with the gas phase reaction catalyst mentioned above. According to these methods, the excess hydrogen is electrochemically ionized on the gas eliminating auxiliary electrode, so that the internal pressure of the battery will not rise above the value which is balanced with the hydrogen eliminating capacity of the auxiliary electrode.

Further, in the lead storage battery a local battery is formed in the positive electrode thereof between the Pb, present in the lattice and the active material, and the $PbO_2$ present in the active material, and the discharge capacity of the positive electrode is declined by the discharge of said local battery. This self-discharge is independent of the charged state of the negative electrode and is not accompanied by the generation of oxygen, the result being only that the $PbSO_4$ is increased and $PbO_2$ decreased.

The discharge capacity declined by a such self-discharge must be recovered to provide for the discharge of nominal capacity. This discharge capacity drop can easily be recovered in a conventional open-type battery which is so designed that the hydrogen generated at the negative electrode can be released to the outside of the battery and the battery can be charged regardless of the charged state of the negative electrode. However, in the conventional sealed-type storage battery utilizing the aforesaid auxiliary electrode, the capacity of the positive electrode can hardly be recovered because the charged state of the positive and negative electrodes and the current for eliminating the gas are closely related to each other.

For example, when in the sealed-type battery utilizing the auxiliary electrode, the rate of the hydrogen gas being generated at the negative electrode is equal to the charging current, i.e. the gas pressure is in the state of equilibrium in the completely charged state of the negative electrode, it is considered that the following relation is established:

$$i_t = i_{O_2} + i_C + i_{H_2} \qquad (1)$$

wherein $i_t$ stands for the charging current, $i_C$ the current for the oxidation of the unoxidized portion of the positive electrode, $i_{O_2}$ the current for the generation of oxygen at the positive electrode and $i_{H_2}$ the current for the electrochemical oxidation of hydrogen. It is also considered that, of the hydrogen corresponding to $i_t$, the part corresponding to $i_{O_2}$ is eliminated at the gas phase catalyst or at a portion of the gas eliminating auxiliary electrode exposed to the gas phase, as a result of a gas phase reaction represented by the chemical formula $2H_2+O_2 \rightarrow 2H_2O$, and the remaining hydrogen, corresponding to $i_t - i_{O_2}$, shows the same speed as that corresponding to $i_{H_2}$ under an equilibrium state of pressure. Therefore, the following relation is established:

$$i_t - i_{O_2} = i_{H_2} \qquad (2)$$

Namely, when the negative electrode has been completely charged and the pressure maintains an equilibrium state, the two equations, i.e.

$$i_t = i_{O_2} + i_C + i_{H_2} \qquad (1)$$

$$i_t - i_{O_2} = i_{H_2} \qquad (2)$$

should be satified. By incorporating Equation 2 into Equation 1, $$i_C = 0 \quad (3)$$

This signifies that when the negative electrode has been fully charged, the excess hydrogen has been eliminated at the auxiliary electrode and the pressure is maintained in an equilibrium state, it is difficult to recover the capacity by oxidizing the uncharged portion. Even under such a state of equilibrium state, the local battery formed in the positive electrodes continues to discharge, without generating oxygen, and the amount of discharge capacity drop increases with time, which can hardly be recovered in this type of sealed battery. In the case of a sealed battery in particular that which comprises a Tudor-type positive electrode, such discharge capacity drop is considerably large and the meritorious feature that the capacity can be increased by the oxidation of Pb, cannot be obtained. Therefore, it is not adequate to employ such a sealing method.

As discussed above, the conventional sealed batteries had the disadvantages that the internal pressure of the battery is built up undesirably high by the excess hydrogen which does not participate in the gas phase reaction and that a declination of the positive electrode capacity, caused by self-discharge, can hardly be recovered.

The present invention aims to solve the aforesaid problems possessed by the conventional sealed batteries, by employing a method in which excess hydrogen generated within the battery is caused to react with the oxygen present in the air introduced into the battery, instead of discharging it to the outside of the battery system.

Namely, the sealed-type lead storage battery according to the present invention comprises a reactive element having a waterproofed catalyst layer and disposed at the boundary between the interior and exterior gas phases of the battery, and an electrolyte-impregnated body closely attached to the inside surface of said reactive element with a portion thereof immersed in the electrolyte.

It is a further object of the present invention to provide a sealed-type lead storage battery of the character described above, in which a catalyst for a gas phase reaction to combine oxygen with hydrogen or a gas eliminating auxiliary electrode or both is or are provided, in addition to said reactive element, whereby the battery is durable with a large charging current.

These and other objects, features and advantages of the present invention will become apparent from the following detailed description taken in conjunction with the accompanying drawings, in which:

FIGS. 1 to 3 are fragmentary cross-sectional views showing the constructions of the essential portions of sealed-type lead storage batteries according to the present invention, respectively;

FIG. 4 is a vertical cross-sectional view diagrammatically showing the construction of a sealed-type lead storage battery, in which the characteristic elements of the present invention are used along with a gas eliminating auxiliary electrode; and FIG. 5 is a diagram graphically showing the relationship between the overcharging time and the internal pressure of the sealed-type lead storage battery according to this invention, in comparison with that of a conventional one utilizing a gas eliminating auxiliary electrode.

The reactive element used in the present invention is a part in which the excess hydrogen inside the battery and the oxygen intruding from the outside of the battery react with each other, and consists of a porous body provided with a suitably waterproofed catalyst layer. To the inside surface of the reactive element is closely attached an electrolyte-impregnated body and a portion of said electrolyte-impregnated body is immersed in the electrolyte. Therefore, the inside surface of the reactive element is always supplied with the electrolyte and only the hydrogen which penetrated the electrolyte layer in the electrolyte-impregnated body can react with the oxygen diffusing into the reactive element from the outside. Since the electrolyte is present in the catalyst layer, it is considered that the reactions in this case are essentially electrochemical ones of a local battery, represented by the formulae:

$$H_2 \rightarrow 2H^+ + 2e, \quad O_2 \rightarrow 2O^{2-} - 4e$$

It is also considered that the oxygen and the hydrogen, which are adsorbed on the same surface of the catalyst in the range to enable the transaction of electrons, will cause a similar local cell reaction, even if the carrier for the catalyst is not made of a conductive material but of a non-conductive material, such as $SiO_2$ or $Al_2O_3 \cdot 3SiO_2$. Further, a gas phase reaction of the type $2H_2 + O_2 \rightarrow 2H_2O$ will also take place at a portion. The water thus formed in the vicinity of the electrolyte is returned to the pool of electrolyte through the electrolyte-impregnated body.

On the other hand, the electrolyte-impregnated body serves to prevent the sulfuric acid mist, the gases and the aqueous vapor, formed inside the battery, from being released to the outside of the battery system directly through the apertures in the reactive element. It also serves to retard the supply of hydrogen relative to the velocity of the oxygen introduced from the outside, by immediately dissolving the hydrogen in the electrolyte layer, so that the hydrogen may completely react with the oxygen to form water. It also serves to supply the electrolyte to the catalyst to promote the electrochemical reaction between the oxygen and hydrogen, and to return the resultant water to the pool of electrolyte. The electrolyte-impregnated body may be made, for example, from a non-woven fabric of chemical fiber, a thin plate of sintered polyvinyl chloride, a glass mat or a carbon fiber cloth, or from any other material which is resistive to acid and capable of being impregnated with electrolyte, or may be made by combining said materials.

As will be understood from the foregoing, the present invention makes it possible to oxidize the unoxidized portion, by introducing oxygen from the outside of the system and without releasing the excess hydrogen to the outside of the system which has not participated in the gas phase reaction within the battery.

The reactive element used in the present invention is, as described above, to prevent outside leakage of the electrolyte and to admit oxygen from the outside to react with hydrogen, while withstanding a pressure change inside the battery. Therefore, it is required to be a porous body having a suitable compressive strength and waterproofing property and being capable of carrying a catalyst. As a material of the reactive element, conductive materials, such as activated carbon, graphite and boron carbide, or non-conductive materials, such as $SiO_2$, $Al_2O_3 \cdot 3SiO_2$, $TiO_2$, glass powder and polystyrene powder, or any other material which is strongly resistive to acid, can be used. However, use of a conductive material is generally preferred.

As a water repellent, polyfluoroethylene, paraffin, silicone resin, polystyrene or any other material which has conventionally been used as an acid-resistant water repellent, can be used. As a catalyst, platinum group metals, such as platinum and palladium, which have been used as an acid-resistant catalyst for electrodes, are employed.

A similar oxygen introducing effect can be obtained from any combination of the abovementioned materials of the element, catalysts and water repellents, but inter alia a reactive element produced by using graphite as substrate, platinum as catalyst and polyfluoroethylene as water repellent, demonstrates excellent moldability, waterproof, reactivity and pressure-resistance.

Instead of imparting a catalytic capacity and a waterproofing capacity uniformly over the entire reactive element, a reactive element composed of two layers consisting of a catalyst layer having a low waterproofing capacity and a catalyst-less compact layer having a high waterproofing capacity, may be used, with said first layer facing the gas phase inside the battery and said second layer facing the outside air. In this case, since a high pressure-resistance and a high waterproof property can be imparted to the catalyst-less layer, it is not necessary to apply a large amount of water repellent to the catalyst layer and, therefore, the activity of the catalyst will not be impaired by the water repellent. The disadvantage of such a construction is that the two layers of different compositions are subjected to deflection in the process of molding and contact between the reactive element and the battery container is dangerous. Such deflection can be avoided by providing one or a plurality of layers on that side of the catalyst-less layer remote from the catalyst layer, to offset the contraction and expansion of the catalyst layer. The simplest method to achieve this is to provide a layer of the same composition as the catalyst layer on the opposite side of the waterproof layer with respect to the catalyst layer. A reactive element having such a deflection preventive layer also exhibits an excellent effect, similar to the double-layer element.

For the formation of the waterproof layer, as will be apparent in the light of the role played thereby, a compact acid-resistant material and an acid-resistant water repellent must be used and no catalyst is required. Another essential requirement for this layer is that the layer has air-passage holes for introducing oxygen therethrough. The deflection preventive layer is not particularly required to have an acid-resisting property and waterproof property, if the waterproof layer is complete, and can be formed of any material which meets the requirement of preventing the deflection. However, to provide against casual electrolyte leakage through the waterproof layer, the deflection preventive layer is preferably provided with a suitable waterproof property and acid-resisting property. The deflection preventive layer is also required not to substantially interfere with the passage of oxygen therethrough.

Now, the construction of the elements according to the invention will be described by way of example. Referring to FIGS. 1 to 3, numeral 1 designates a battery container made of a synthetic resin, 2 an electrolyte, 3 a gas phase within the battery, 4 a gas phase outside the battery, 5 an electrolyte-impregnated body and 6 a reactive element. The reactive element 6 is provided at the boundary between the interior and exterior gas phases of the battery. The electrolyte-impregnated body 5 is tightly attached to the inside surface of the reactive element 6, with a portion thereof immersed in the electrolyte 2.

The reactive element 6 shown in FIG. 1 exemplifies a type which consists of a homogeneous layer having a suitable waterproofing capacity and catalytic capacity.

The reactive element shown in FIG. 2 exemplifies a type which is composed of an active catalyst layer $6_1$ having a low waterproofing capacity and a highly waterproof, catalyst-less, pressure-resisting waterproof layer $6_2$ provided on the outside surface of said catalyst layer $6_1$.

The reactive element shown in FIG. 3 exemplifies a type which is composed of an active catalyst layer $6_1$ of low waterproofing capacity, a catalyst-less waterproof layer $6_2$ of high waterproofing capacity provided on the outside surface of said catalyst layer and a deflection preventive layer $6_3$ provided on the outside surface of said waterproof layer $6_2$.

Referring to FIG. 4, there is shown a lead storage battery incorporating the elements of this invention. In FIG. 4, numeral 7 designates a resistance element to control the potential of a gas eliminating auxiliary electrode 8 to be maintained at a value suitable for the elimination of gases, 9 a positive electrode, 10 a negative electrode, 11 an oxygen inlet port, 12 a reactive element mounting cap, 13 an O-ring for sealing the connection between the container 1 and the cap 12, 14 a threaded portion for mounting the cap 12 and 15 a safety valve.

The surface of the element 6 which is in contact with the interior gas phase of the battery and not covered by the electrolyte-impregnated body 5, is coated with an adhesive, though not apparent in the drawings.

Examples of the reactive element of this invention will be illustrated hereunder:

EXAMPLE 1

Reactive element consisting of a homogeneous layer having a suitable waterproofing capacity and catalytic capacity Activated carbon having 2% of platinum black added thereto by reduction with Formalin and ethylene tetrafluoridepropylene hexafluoride copolymer powder were mixed at the weight ratio of 73 to 27. 10 g. of the resultant mixture was molded into a size of 50 x 60 mm.$^2$ under a pressure of about 0.5 t./cm.$^2$.

EXAMPLE 2

Reactive element consisting of an active catalyst layer having a low waterproofing capacity and a catalyst-less pressure-waterproof layer having a high waterproofing capacity Activated carbon having 2% of platinum black added thereby by reduction with Formalin and ethylene tetrafluoridepropylene hexafluoride copolymer powder were mixed at the weight ratio of 95 to 5 to provide a mixture for the formation of a catalyst layer. Separately, a fine graphite powder and ethylene tetrafluoride-propylene hexafluoride copolymer were mixed at the weight ratio of 1 to 1 to produce a mixture for the formation of a waterproof layer. 5 g. of the former mixture and 10 g. of the latter mixture molded under a pressure of about 0.5 t./cm.$^2$ to form a 50 x 60 mm.$^2$ reactive element consisting of a catalyst layer and a waterproof layer.

EXAMPLE 3

Reactive element comprising a deflection preventive layer

Activated carbon powder having a 2% of platinum black added thereto by reduction with Formalin and ethylene tetrafluoride-propylene hexafluoride copolymer powder were mixed at the weight ratio of 95 to 5 to give a mixture for the formation of a catalyst layer. Separately, a fine graphite powder and ethylene tetrafluoride-propylene hexafluoride copolymer powder were mixed in a weight ratio of 1 to 1 to give a mixture for the formation of a waterproof layer. Further, a catalyst-free activated carbon and ethylene tetrafluoride-propylene hexafluoride copolymer powder were mixed at the weight ratio of 95 to 5 to give a mixture for the formation of a deflection preventive layer. 3 g. of the catalyst layer-forming mixture, 5 g. of the waterproof layer-forming mixture and 3 g. of the deflection preventive layer-forming mixture were molded under a pressure of about 0.5 t./cm.$^2$ to form a 50 x 60 mm.$^2$ reactive element.

EXAMPLE 4

Reactive element comprising a deflection preventive layer which is of different material and composition from a catalyst layer Activated carbon having 2% of platinum black added thereto by reduction with Formalin and ethylene tetrafluoride-propylene hexafluoride copolymer powder were mixed at the weight ratio of 95 to 5 to give a mixture for the formation of a catalyst layer. Separately, a fine graphite powder and ethylene tetrafluoride-propylene hexafluoride copolymer powder were mixed at the weight ratio of 1 to 10 to give a mixture for the formation of a pressure-resistant waterproof. layer. Further, silicic acid anhydride powder and silicone resin were mixed at the weight ratio of 90 to 10 to give a mixture for the formation of a deflection preventive layer. 3 g. of the catalyst layer-forming mixture, 5 g. of the waterproof layer-forming mixture and 1.8 g. of the deflection preventive layer-forming mixture were molded under a pressure of about 0.5 t./cm.$^2$ to form a 50 x 60 mm.$^2$ reactive element. The charging amount of the deflection preventive layer-forming mixture was determined according to the deflection preventing condition to be achieved by the silicic acid anhydride-silicone resin mixture, and is variable depending upon the composition of the mixture. It is also variable depending upon the types of material, composition and charging amount of the catalyst layer-forming mixture.

FIG. 5 shows the relationship between the battery internal pressure and the time of overcharge, obtained on each of sealed batteries of a construction as shown in FIG. 4 incorporating the reactive elements of Examples 1, 2, 3 and 4 respectively. Each plate-like reactive element used was cut out from the shaped element produced in each example illustrated above, so that the surface area on one side thereof would be 2.5 cm.$^2$. The overcharging current was 100 ma. For the positive electrode, a Tudor-type electrode of 100 A$h$ nominal was used. The electrolyte-impregnated body consisted of a laminate of two 0.15 mm. thick, acid-resistant non-woven fabrics of chemical fiber.

In order to make clearer the effect of the present invention, the pressure change of a battery E is also shown in FIG. 5, which battery was constructed as shown in FIG. 4 but without using the elements of the present invention.

As may be apparent from FIG. 5, in the conventional battery E not utilizing the elements of the present invention the internal pressure decreases at the initial stage of overcharge due to a gas phase reaction on the auxiliary electrode between the hydrogen and the oxygen present within the battery, and then increases to a high level as excess hydrogen is accumulated, until it reaches a state of equilibrium relative to the capacity of the auxiliary electrode.

In the batteries A, B, C, and D, utilizing the elements of the present invention, as contrasted, the internal pressure decreases at the initial stage of overcharge and thereafter is maintained at a low level at which excess hydrogen reacts with the oxygen introduced from the outside.

With reference to the discharge capacity after the overcharge, the discharge capacity of the battery A after 7,500 hours was increased 112% of the initial capacity, whereas that of the battery E was decreased to 80% of the initial capacity. Further, the discharge capacities of the batteries B, C and D after 8,760 hours were 102%, 99.7% and 99.9% of the initial capacities respectively, whereas that of the battery E was 78%.

The electrolyte in each battery was not decreased even after about 9,000 hours.

As has been described hereinabove, according to the present invention there is provided a sealed-type lead storage battery in which an internal pressure rise due to the accumulation of excess hydrogen can be prevented by causing the excess hydrogen to react with oxygen introduced from the outside, a capacity drop due to the self-discharge of the positive electrode can be prevented and a decrease of the electrolyte can be prevented, and which, therefore, can be easily maintained.

When the overcharging current is small, namely when it is so small as to permit the diffusion of the oxygen and hydrogen, generated within the battery into the electrolyte in the electrolyte-impregnated body for reaction in the reactive element, a sealed battery can be composed only of the elements of the present invention. It is, however, to be noted that when the battery is to be overcharged with a large current, the use of a catalyst for a gas phase reaction to combine oxygen and hydrogen with each other to form water and a gas eliminating auxiliary electrode as used in the preceding example, either singly or in combination will remarkably enhance the effect of the present invention.

What is claimed is:

1. A sealed-type lead storage battery comprising a positive electrode, a negative electrode, an electrolyte, a sealed container accommodating said electrodes and said electrolyte, a catalytically reactive element adapted to catalyze water forming reaction of oxygen and hydrogen provided in a portion of said container separating the gas phase inside the battery and the outside air from each other and having a waterproofing capacity and catalytic capacity, and an electrolyte-impregnated body closely attached in direct physical contact to the inside surface of said reactive element with a portion thereof immersed in the electrolyte.

2. A sealed-type lead storage battery as defined in claim 1, wherein said reactive element consists of a homogeneous layer having a catalytic capacity and waterproofing capacity.

3. A sealed-type lead storage battery as defined in claim 1, wherein said reactive element consists of an active catalyst layer having a low waterproofing capacity and a catalyst-less waterproof layer having a high waterproofing capacity, and mounted with said catalyst layer facing the gas phase in the battery and said waterproof layer facing the outside air.

4. A sealed-type lead storage battery as defined in claim 1, wherein said reactive element consists of an active catalyst layer having a low waterproofing capacity, a catalyst-less waterproof layer having a high waterproofing capacity and provided on one side of said catalyst layer, and a deflection preventive layer of the same expansibility and contractibility as said catalyst layer and provided on that side of said waterproof layer remote from said catalyst layer, said reactive element being mounted with said catalyst layer facing the gas phase in the battery and said deflection preventive layer facing the outside air.

5. A sealed-type lead storage battery as defined in claim 1, wherein a gas eliminating auxiliary electrode is provided.

6. A sealed-type lead storage battery as defined in claim 1, wherein a gas eliminating auxiliary electrode is provided.

References Cited

UNITED STATES PATENTS

| | | | |
|---|---|---|---|
| 2,465,202 | 3/1949 | Craig | 136—179 |
| 2,471,585 | 5/1949 | Rittenhouse et al. | 136—179 |
| 3,038,954 | 6/1962 | Pattison et al. | 136—179 |
| 3,159,508 | 12/1964 | Chreitzberg | 136—166 |
| 3,356,533 | 12/1967 | Carson | 136—6 |
| 3,462,303 | 8/1969 | Reber | 136—3 |

WINSTON A. DOUGLAS, Primary Examiner

A. SKAPARS, Assistant Examiner

U.S. Cl. X.R.

136—179